US006813595B2

(12) United States Patent
Edgar

(10) Patent No.: US 6,813,595 B2
(45) Date of Patent: Nov. 2, 2004

(54) PORTABLE FLIGHT SIMULATOR

(76) Inventor: Allen G. Edgar, 2503 Linden Way, Cheyenne, WY (US) 82009

( * ) Notice: Subject to any disclaimer, the term of this patent is extended or adjusted under 35 U.S.C. 154(b) by 703 days.

(21) Appl. No.: 09/732,924

(22) Filed: Dec. 11, 2000

(65) Prior Publication Data
US 2003/0152893 A1 Aug. 14, 2003

Related U.S. Application Data
(60) Provisional application No. 60/171,654, filed on Dec. 27, 1999.

(51) Int. Cl.[7] .............................. G09B 9/08; G09B 19/16
(52) U.S. Cl. ................................ 703/8; 434/30; 434/38; 348/123
(58) Field of Search .......................... 703/8, 7; 434/30, 434/38, 123; 348/123

(56) References Cited

U.S. PATENT DOCUMENTS

| 4,164,080 A | * | 8/1979 | Kosydar et al. ............... 434/38 |
| 4,373,169 A | * | 2/1983 | Burkam ....................... 348/123 |
| 4,390,253 A | * | 6/1983 | Lobb ........................... 359/366 |
| 5,009,598 A | * | 4/1991 | Bennington ................... 434/30 |
| 5,082,198 A | | 1/1992 | Patel |
| 5,272,652 A | | 12/1993 | Rosenshein et al. |
| 5,316,480 A | | 5/1994 | Ellsworth |
| 5,380,204 A | | 1/1995 | Decker |
| 5,509,806 A | | 4/1996 | Ellsworth |
| 5,616,030 A | | 4/1997 | Watson |
| 5,627,311 A | | 5/1997 | Nakaya et al. |
| 5,756,891 A | | 5/1998 | Nakaya et al. |
| 5,791,903 A | * | 8/1998 | Feuer et al. ................... 434/38 |
| 5,865,624 A | | 2/1999 | Hayashigawa |
| 5,866,813 A | | 2/1999 | Nakaya et al. |

FOREIGN PATENT DOCUMENTS

| DE | 2517410 | 4/1976 |
| RU | 2006071 | 1/1994 |

OTHER PUBLICATIONS

Play Meter Catalog, Feb. 1991, Discussion of "SEGA R360" Amusement Ride.

* cited by examiner

Primary Examiner—Albert W. Paladini
(74) Attorney, Agent, or Firm—Richard C. Litman

(57) ABSTRACT

A portable flight simulator is installed upon a conventional vehicle trailer for storage and transportation to various sites. The apparatus includes a folding video screen which when erected provides a relatively wide and long field of view for the operator of the simulator, rather than a relatively small and close video monitor display. The screen and video projector are immovably affixed to an operator cab or cockpit when the simulator apparatus is erected for operation, with cockpit movement and attached screen and projector being controlled by the operator in the cockpit. A conventional personal computer and flight simulator program provide the video signal for the projector, which projects the video program onto the screen. The operator reacts to the video program by using a control stick to control the orientation of the video program conventionally. Audio output may also be provided for realistic sound effects, or music for the operator.

20 Claims, 9 Drawing Sheets

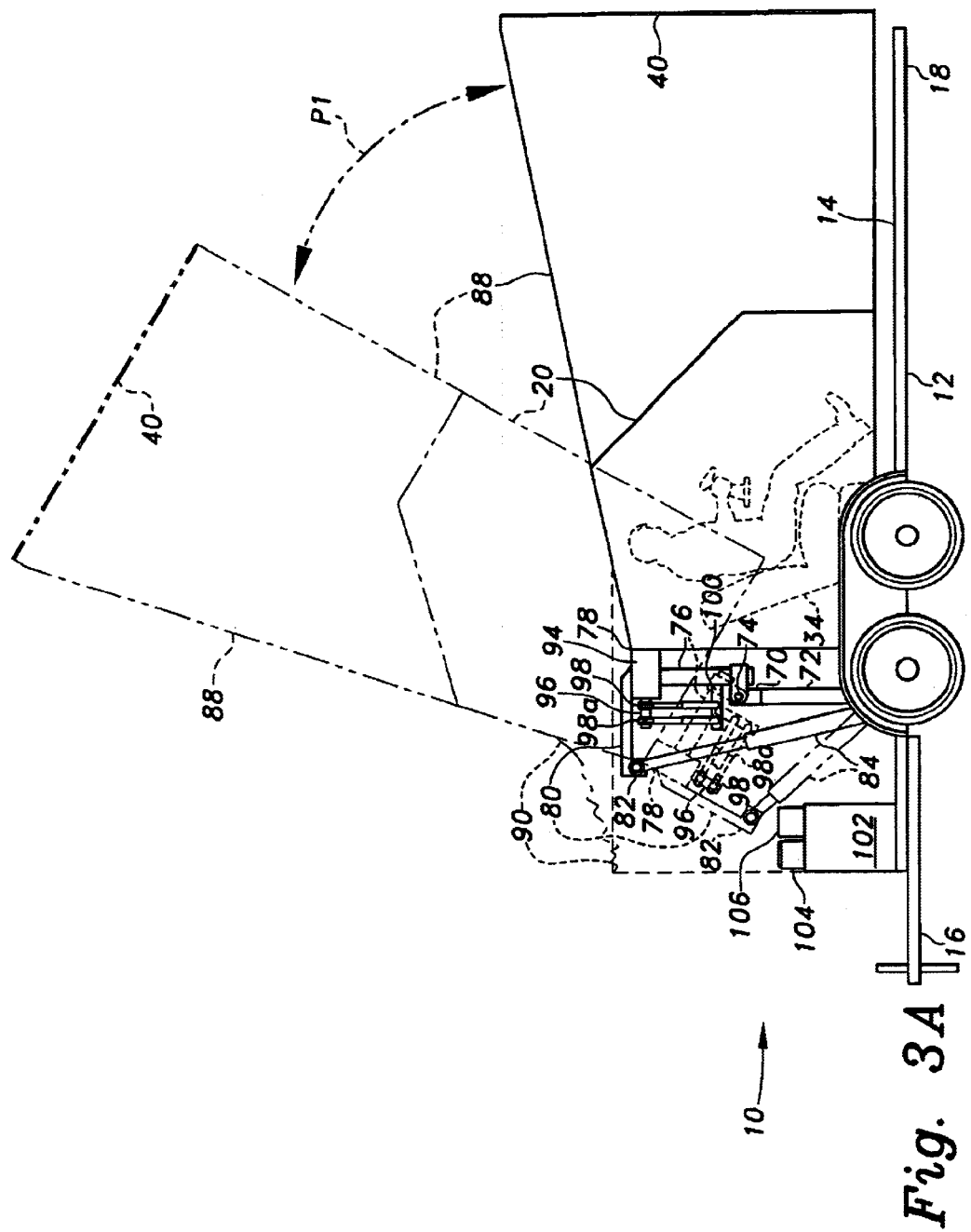

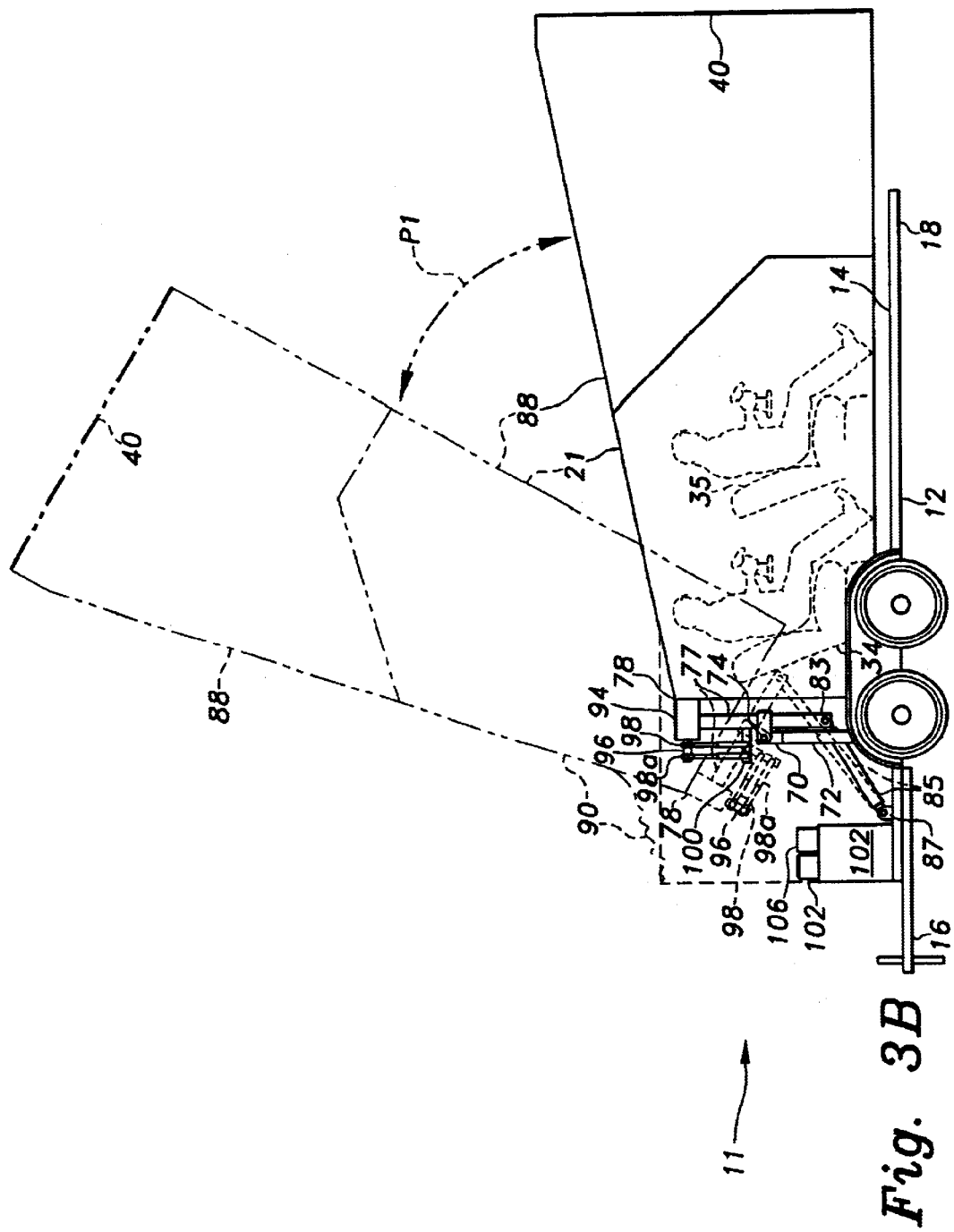

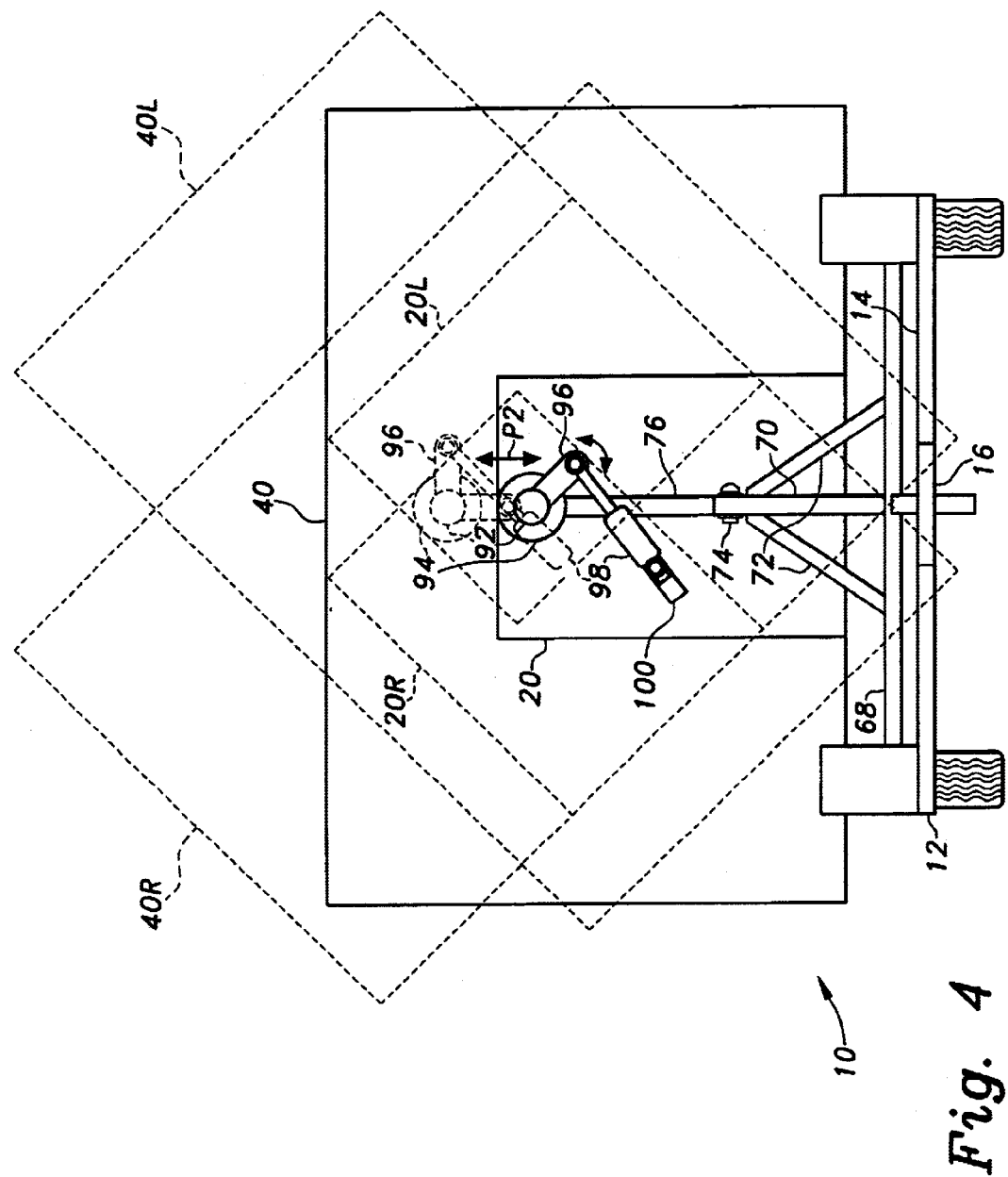

PORTABLE FLIGHT SIMULATOR

CROSS-REFERENCE TO RELATED APPLICATION

This application claims the benefit of U.S. Provisional Patent Application Ser. No. 60/171,654, filed Dec. 27, 1999.

BACKGROUND OF THE INVENTION

1. Field of the Invention

The present invention relates generally to simulation devices, and more specifically to a two axes of motion flight simulator apparatus installed upon a trailer for portability. The present flight simulator includes a hydraulic system for driving the two axes of motion, with the operator of the device controlling the motion through a control stick. A video presentation is projected onto a relatively large screen, with the operator responding to the visual cues projected onto the screen. The screen assembly disassembles and folds for storage and trailering of the simulator.

2. Description of the Related Art

Flight and other vehicle simulators have been found to provide worthwhile benefits in the training of pilots and vehicle operators. This is particularly true when the simulator provides an extremely realistic simulation. However, it is universally true in the simulator field, that the more realistic the simulation, the more costly is the construction and operation of the simulator.

While the cost of such simulation may not be of extreme concern for the military, large airlines, and large flight training operations, where purchase, operational, and maintenance expenses are covered by government allocations or passed on to customers, and where such simulation is more cost effective than actual flight in a large and/or complex aircraft, it has been difficult in the past to provide a realistic and yet cost effective flight simulation for casual users of such devices or for smaller flight schools and the like. The personal computer has made the visual aspects of such flight simulation relatively affordable, even to the extent of simulating relatively complex military operations and aircraft. Such simulations can be quite enjoyable even for the casual operator, but their realism (or rather, lack thereof) leaves a great deal to be desired, with their relatively small monitor screens, lack of realistic enclosure, and particularly, the lack of any motion cues for the operator.

While such personal computer flight simulator programs are quite portable, they do nothing to simulate the physical environment, which detracts considerably from the experience. On the other hand, two and three axes of motion flight simulators with realistic enclosures for the operator, are almost universally very large and heavy, and are fixed in position at a single location; they are by no means portable.

Accordingly, a need will be seen for a portable flight simulator which utilizes a conventional personal computer flight simulation program, and projects the program onto a large screen to provide a large and realistic field of view for the operator. The present simulator also provides two axes of motion for the operator, with the motion being driven by a hydraulic system which is in turn actuated by a novel electronic pickup means at the control stick in the operator's cab or cockpit of the simulator. Additional realism may be added by means of a sound system driven from the flight simulator program of the computer. The entire system is mounted on a trailer for portability, with only the screen requiring erection for use of the simulator and disassembly and folding for movement of the device.

A discussion of the related art of which the present inventor is aware, and its differences and distinctions from the present invention, is provided below.

U.S. Pat. No. 5,082,198 issued on Jan. 21, 1992 to Navnit R. Patel, titled "Recreational Flying Vehicle," describes a vehicle producing aerodynamic lift while being permanently but movably attached to a surface vehicle (boat, etc.). A multiple arm linkage extends between the surface vehicle and "flight" vehicle, thus permitting the "flight" vehicle to lift free of the surface vehicle to the extent of the attachment arms therebetween. The Patel device is not a true flight simulator, as its control system is not conventional, nor can the upper "flight" portion of the device move angularly relative to lower portion, more than a very limited amount. No visual simulation, hydraulic operation, or electronic control of a hydraulic motion actuation system is disclosed by Patel, nor is the Patel device mounted on a non-driven trailer for portability, as is the present portable flight simulator.

U.S. Pat. No. 5,272,652 issued on Dec. 21, 1993 to Leon Rosenshein et al., titled "Expanded Field Of View (EFOV) Display For Real-Time, Manned, Interactive Air Combat Simulation, Including Close-In Combat," describes a simulator video system using a single cathode ray tube (CRT) to present the visual images. Contrary to the "expanded field of view" phrase used in the Rosenshein et al. patent, the device does not truly provide such an expanded field of view. Rather, the Rosenshein et al. video display tube presents visual information which would not be seen by the pilot in his or her forward field of view, in a supplementary "window" on the CRT screen generally in front of the pilot or operator. In contrast, the present flight simulator uses a wide angle projection system placed several feet in front of the operator, for realistic depth of field. Also, while Rosenshein et al. state that one of their objects is to use their system with a six degree freedom of motion flight simulation model, no such apparatus is disclosed. Moreover, Rosenshein et al. are silent regarding portability for their system.

U.S. Pat. No. 5,316,480 issued on May 31, 1994 to Thayne N. Ellsworth, titled "Portable Multiple Module Simulator Apparatus," describes an amusement device seating a relatively large number of people (about a dozen). The members of the audience each have a relatively small video screen in front of them, with control of the video image being provided by touch screen means. Some limited motion of the device is also provided. The Ellsworth device differs from the present flight simulator in that it requires several trailers for carrying and storing the entire apparatus; does not provide realistic control of the motion by means of a control stick for the occupant; carries a plurality of occupants simultaneously, none of whom have any control over the motion of the device; and presents the video output as a relatively small screen in front of each occupant.

U.S. Pat. No. 5,380,204 issued on Jan. 10, 1995 to William M. Decker, titled "Night Vision Goggle Aided Flight Simulation System And Method," describes a means for simulating relatively low lighting for display on multiple CRT displays, with the operator of the device wearing "night vision" glasses or goggles for seeing the low intensity displays. Decker makes no mention of any form of portability, and does not provide a projected visual image on a wide field of view screen, as is the case with the present simulator apparatus. Moreover, while Decker provides some motion, the motion is extremely limited in comparison to the motion provided by the present portable flight simulator.

U.S. Pat. No. 5,509,806 issued on Apr. 23, 1996 to Thayne N. Ellsworth, titled "Portable Multiple Module Simulator Apparatus And Method Of Use," describes an amusement ride device substantially as described in the '480 U.S. patent to the same inventor. The '806 U.S. patent is in fact a continuation-in-part of the '480 U.S. patent, and accordingly, the same points of distinction between the '480 U.S. patent and the present invention are felt to apply here.

U.S. Pat. No. 5,616,030 issued on Apr. 1, 1997 to Bruce L. Watson, titled "Flight Simulator Employing An Actual Aircraft," describes an assembly of components providing for removable installation in an actual aircraft for simulator use while the aircraft is parked on the ground. Simulated flight control actuation members (control yoke, etc.) and throttle(s) are removably attached to the actual control components of the aircraft, with movement of the simulator controls being input to a computer. The computer then provides an output to a single CRT screen which displays only a simulation of the instruments and readouts found on the conventional instrument panel of the aircraft. Watson does not provide for any motion of the aircraft by means of his simulator apparatus, nor does he provide a wide field of view simulating the external view from the cockpit of the aircraft, both of which features are provided by the present portable flight simulator apparatus.

U.S. Pat. No. 5,627,311 issued on May 6, 1997 to Teruomi Nakaya et al., titled "Transportable Three-Dimensional Calibration Wind Tunnel System, Verification Method Of Flight Control System And Flight Simulator Using Same," describes a simulation system using the computerized flight control system of an actual advanced technology aircraft (i.e., "fly by wire" control system). The basic apparatus is a small wind tunnel which is arcuately adjustable about its horizontal and vertical axes, with the outflow of the tunnel being directed to blow upon the pitot-static probe of the stationary aircraft. Variations in angular horizontal and vertical directions are detected by the multiple port probe, and cause the flight and/or engine control systems to respond accordingly in their automatic modes. The aircraft systems may be wired to a flight simulator to drive the simulator, as well. However, the flight simulator described in the Nakaya et al. U.S. patent, is a conventional high technology device which is not portable, as indicated by the permanently mounted base attachment ends of the legs of the Stewart platform support apparatus of the simulators shown in FIGS. 9 and 12 of Nakaya et al. Only the wind tunnel device itself, and the aircraft with which the wind tunnel is used, are portable due to the technology used with the Nakaya et al. wind tunnel, whereas the entire flight simulator device of the present invention is portable. Moreover, the present invention does not utilize any actual aircraft systems or componentry, which results in a considerably more economical system than the Nakaya et al. wind tunnel, aircraft, and simulator system.

U.S. Pat. No. 5,756,891 issued on May 26, 1998 to Teruomi Nakaya et al., titled "Verification Method Of A Flight Control System Using A Transportable Wind Tunnel," describes a method of using the wind tunnel system described in the '311 U.S. patent discussed immediately above. The same points of distinction noted above between the Nakaya et al. apparatus and the present invention, are felt to apply here as well.

U.S. Pat. No. 5,865,624 issued on Feb. 2, 1999 to Larry Hayashigawa, titled "Reactive Ride Simulator Apparatus And Method," describes a system wherein various sensors and cameras are mounted on a vehicle (race car, high performance aircraft, boat, etc.) and transmit or record the visual effects and corresponding physical forces involved in high performance operation of the vehicle. These signals may be delivered in real time to a simulator in which a person is passively positioned, or the recorded signals may be used to drive the simulator at a later time. The simulator provides a visual and physical simulation of a ride in the actual craft or vehicle from which the signals were recorded or transmitted. However, the occupant of the Hayashigawa simulator is purely a passive rider, and cannot input any control to the device to control the progress or outcome of the ride. All motion and visual effects are provided from the actual vehicle, which is controlled by another person. In contrast, the present flight simulator apparatus, and the quality of the physical effects, are controlled by the person who is riding within the simulator, in accordance with control inputs responsive to a video presentation.

U.S. Pat. No. 5,866,813 issued on Feb. 2, 1999 to Teruomi Nakaya et al., titled "Transportable Three-Dimensional Calibration Wind Tunnel System, Verification Method Of Flight Control System Using Said System And Flight Simulator Using Said System," is a divisional patent of the parent '311 U.S. patent discussed further above. In the '813 divisional patent, Nakaya et al. claim the flight simulator apparatus disclosed in the parent '311 U.S. patent. Accordingly, the points made further above in the discussion of the '311 U.S. patent, are seen to apply here.

German Patent Publication No. 2,517,410 published on Apr. 1, 1976 to James R. Bede describes (according to the English abstract) a grounded flight trainer utilizing an actual aircraft which is positively attached to a ground propulsion vehicle (truck, etc.) by an elongate boom extending forwardly therefrom. The boom provides limited motion in several degrees of freedom for the aircraft, and enables the pilot trainee to develop a feel for the aircraft in the relatively slow and low takeoff and landing modes. The Bede apparatus does not utilize any projected video nor electro-hydraulic input from the operator to actuate the motion of the device, but rather depends upon the actual aerodynamic reactions of the actual aircraft in response to the aerodynamic controls as actuated by the pilot trainee within the aircraft, to maneuver the aircraft accordingly, depending upon the speed at which the propulsion vehicle is driven. As the present simulator does not rely upon aerodynamics for motion, it remains stationary once installed at a site, unlike the Bede apparatus.

Russian Patent Publication No. 2,006,071 published on Jan. 15, 1994 describes (according to the English abstract) a portable flight simulator apparatus comprising a tow vehicle which also carries the control system, a trailer which carries the flight simulator apparatus, and another trailer with a portable "water plant," by which is likely meant the hydraulic power source for driving the motion of the simulator. The motion linkage for the simulator is a hexahedral linkage, which apparently provides angular and limited linear motion in only a single plane, i.e., the vertical longitudinal plane, thus being limited to simulating longitudinal accelerative and pitch forces. In contrast, the present flight simulator invention provides both pitch and roll angular motion; provides a wide angle field of view with its folding projection screen; carries the hydraulic system for powering the motion of the device, on board the same trailer as carries the flight simulator apparatus; and utilizes a relatively inexpensive personal computer, flight simulator program, and compatible control system for the video presentation and actuation of the hydraulic system.

Finally, page 110 of the February 1991 issue of "Play Meter" describes the "R360" simulator built by the Sega Corporation. The device is capable of rotating angularly 360 degrees in yaw, pitch, and roll. However, no disclosure of portability is evident, as the device is intended for use in a video arcade or the like. Also, the disclosure is silent regarding the means of providing the video display (if any; none is disclosed) and the means for powering the device. The device is apparently relatively small, judging by the external video monitor visible in the disclosure. Thus, no relatively large video screen providing a relatively large field of view, is provided with the Sega device.

None of the above inventions and patents, taken either singly or in combination, is seen to describe the instant invention as claimed.

SUMMARY OF THE INVENTION

The present invention comprises a portable flight simulator, with essentially the entire apparatus being installed upon a single relatively light trailer (e.g., flatbed for carrying an automobile) for towing by a relatively light vehicle (pickup truck, etc.); a truck tractor and semi-trailer are not required for transporting the present apparatus. The present flight simulator apparatus includes an enclosable cab or cockpit and means for moving the cockpit arcuately about the pitch and roll axes thereof. A foldable wide angle video projection screen and projection system are provided, with the screen and projection system being fixedly attached to the cab or cockpit during simulator operation, so the screen, projection system, and cockpit move in unison when the cockpit movement controls are actuated. A conventional small personal computer and flight simulator program are used to provide the video display to the projector, with an operator within the cockpit controlling movement of the cab and video display system by means of a conventional computer control stick or "joystick."

The base of the control stick includes a series of microswitches which communicate with a corresponding series of electric solenoid actuated hydraulic control valves in the hydraulic system. Movement of the control stick in pitch and/or roll, actuate the corresponding solenoids, which in turn actuate the corresponding hydraulic valves in the hydraulic system to power the cab and its attached video projection system in the pitch and roll axes. Thus, the operator of the device may respond to the program projected on the screen (simulated enemy fighters, etc.) by actuating the control stick, which drives the flight simulator program conventionally to affect the video display, while simultaneously moving the cab or cockpit and its attached video display about the pitch and/or roll axes to provide a realistic flight feel simultaneously with the video presentation.

Accordingly, it is a principal object of the invention to provide an improved portable flight simulator apparatus installed upon a single vehicle trailer or the like for transportation and storage.

It is another object of the invention to provide an improved portable flight simulator which is easily erected to provide a large screen video presentation with a relatively long depth of field from the operator.

It is a further object of the invention to provide an improved portable flight simulator using conventional personal computer means and flight simulator program means for driving a projector for the video screen.

An additional object of the invention is to provide an improved portable flight simulator having a conventional computer control stick with microswitch means incorporated therewith for controlling a hydraulic actuation system for the simulator.

Still another object of the invention is to provide an portable flight simulator in which an hydraulic actuation system provides simultaneous movement in pitch and roll axes as desired.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

FIG. 3A is a simplified side elevation view showing the operation of the hydraulic pitch control mechanism.

FIG. 3B is a side elevation view an alternative embodiment including a second occupant seat and revised pitch actuation.

FIG. 4 is a simplified end elevation showing the operation of the hydraulic roll control mechanism.

Similar reference characters denote corresponding features consistently throughout the attached drawings.

DETAILED DESCRIPTION OF THE PREFERRED EMBODIMENT

The present invention is a portable flight simulator which is self contained and which may be stored and transported on a conventional light weight automobile trailer or the like, for transport to carnivals, fairs, shopping malls, etc. The present simulator device provides two arcuate degrees of motion for the operator or occupant of the device, and is relatively economical to operate due to the novel means for the operator to control the pitch and yaw angular motions of the device in accordance with a conventional computer operated video display. The wide field of view provided by the present simulator provides a realistic visual field which is not known in other simulator devices, particularly relatively costly simulator devices incorporating motion.

Figure 1:
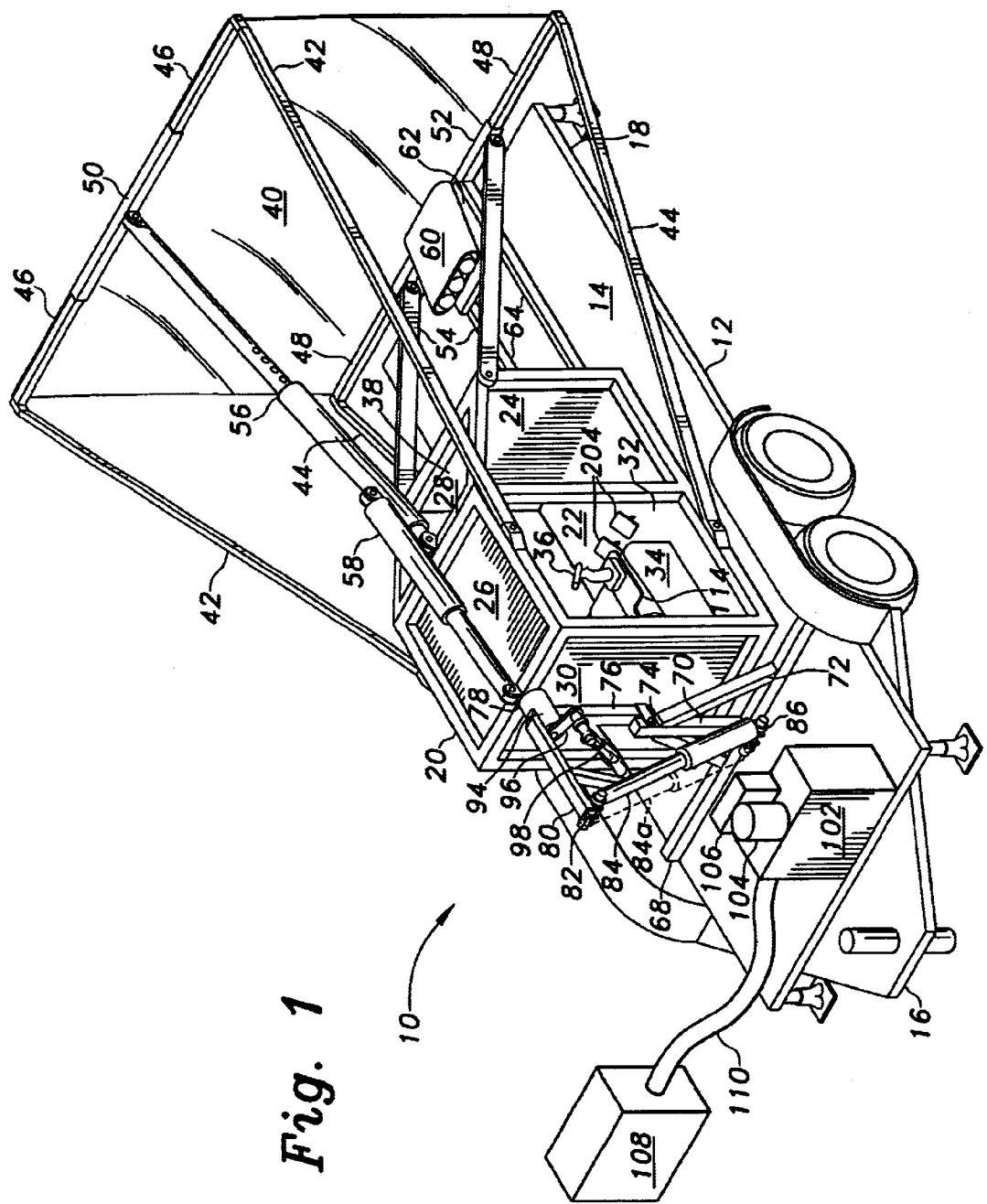
FIG. 1 is a perspective view of the present portable flight simulator with enclosure or covering removed, showing its structure and various features thereof.

A top and right side perspective view of the present portable simulator apparatus is shown in FIG. 1, and designated by the reference numeral 10 throughout the drawings. The simulator apparatus 10 includes a mobile trailer base 12 upon which the simulator structure is arcuately secured by means of mutually independent pitch and yaw motion mechanisms, described further below. The trailer is otherwise conventional, comprising a generally flat bed 14 having a forward or tongue end 16 and opposite rear end 18. (It will be seen that the simulator apparatus mounted atop the trailer 12, is facing rearwardly relative to the trailer 12 in FIG. 1. However, the simulator structure may be installed to face forward upon the trailer 12, if so desired.)

A flight simulator cab or cockpit 20 is mounted atop the bed 14 of the trailer 12, with the mounting structure being described further below. The cockpit 20 is generally enclosed, having a floor 22, opposite side walls 24, a top 26, and forward and rearward panels 28 and 30 (relative to the movable structure, which is mounted facing rearwardly on the trailer 12). One of the side panels may include an opening 32 therein, for access to the interior of the cockpit 20. A conventional door or other closure (not shown, for clarity in the drawing Figures) is provided to close the cockpit 20 during operation of the simulator. A seat 34 and control stick 36 (described in detail further below) are provided within the cockpit or cab 20 of the present simulator apparatus 10.

At least the upper portion of the forward panel 28 has an opening 38 therethrough, to provide the operator with a view of the video screen 40 positioned forwardly of the cockpit 20 (at the real end 18 of the trailer 12) when the simulator is in operation. The screen 40 is not secured directly to the trailer 12, but rather is immovably affixed to the cockpit or cab 20. Thus, when the cockpit 20 moves in pitch and yaw, as described further below, the screen 40 moves in unison therewith, to provide a relatively fixed viewing surface for a simulator operator seated within the cockpit 20.

The screen 40 is a relatively large rectangular pliable and reflective sheet of material, which may be folded, rolled, or otherwise compactly stored when not in use. The screen 40 cannot be constructed of transparent materials, but may be constructed of translucent materials to allow the video presentation projected onto the screen 40, to be viewed from outside the present simulator apparatus, particularly at night or in darkened conditions. The screen 40 may be formed of opaque materials for use in daylight or lighted conditions.

Pairs of upper and lower screen corner brace arms, respectively 42 and 44, are removably attached to the cockpit or cab structure 20 by conventional bolts, pins, or the like. These arms 42 and 44 may have a generally L-shaped configuration, with their respective distal ends 46 and 48 fitting into mating upper and lower central screen supports, respectively 50 and 52. A pair of generally diagonal screen brace arms 54 extends from the upper forward corners of the cockpit 20 to the lower screen support 52.

An upper central screen lift arm 56 is operated by a screen lift hydraulic strut 58, for raising and lowering the upper screen support 50 when erecting and lowering the screen 40. The hydraulic system for the screen lift strut 58 and other hydraulically actuated components of the present flight simulator 10, is discussed further below. The relatively large screen (on the order of ten feet wide, although other sizes may be used) requires folding for transportation of the simulator on its trailer, with the hydraulically actuated screen lift strut simplifying the erection and folding of the screen 40.

When the present simulator is to be readied for use, the distal ends 48 of the lower screen corner brace arms 44 are inserted into the lower center screen support tube 52, and pinned to the opposite sides of the cockpit enclosure 20, generally as shown in FIG. 1 of the drawings. The screen 40 is then raised by means of the screen lift strut 58 and arm 56, with the distal ends 46 of the upper screen corner brace arms 42 being inserted in the upper central screen support crossmember 50 and pinned to the upper portion of the cockpit 20. The rectangular shape of the various screen support members, particularly the distal ends 46 and 48 of the upper and lower supports 42 and 44 and their respective mating upper and lower central screen support members 50 and 52 into which they insert, provide a more positive means of affixing the screen 40 relative to the cockpit 20, assuring that no rotation of the central screen support members 50 and 52 may occur relative to the screen support arms 42 and 44.

The above described corner brace arms 42 and 44, along with the hydraulic screen lift arm 56 and the diagonal screen braces 54, ensure that the deployed screen 40 will remain in a fixed position relative to the cockpit or cab 20, regardless of the orientation of the cockpit 20 during movement thereof as the present flight simulator is operated. In other words, the screen 40 moves along with the cockpit or cab 40 during operation of the present simulator. Folding of the screen 40 is accomplished generally by reversing the erection process described above, i.e., removing the upper corner screen braces 42, lowering the screen lift arm 56, and removing the lower corner screen braces 44 and folding or rolling the screen 40 to reduce the width of the simulator 10 to a width on the order of seven feet, for legal towing on public roads.

The video program utilized by the present flight simulator apparatus 10 is projected by means of a conventional video projector 60 (e.g., Sharp, tm; etc.) which receives the video signals from a conventional personal computer (indicated in the block diagram of FIG. 8) used for playing the flight simulator program. The projector 60 is mounted on a plate 62 adjacent the base of the screen 40, with the plate being stabilized by a pair of projector support arms 64 which extend between the forward lower portion of the cockpit or cab 20 and the lower center screen support 52. These projector support arms 64 and the projector 60 remain in place at all times during the storage and operation of the present simulator, immovably affixed relative to the cockpit structure 20.

Figure 2:
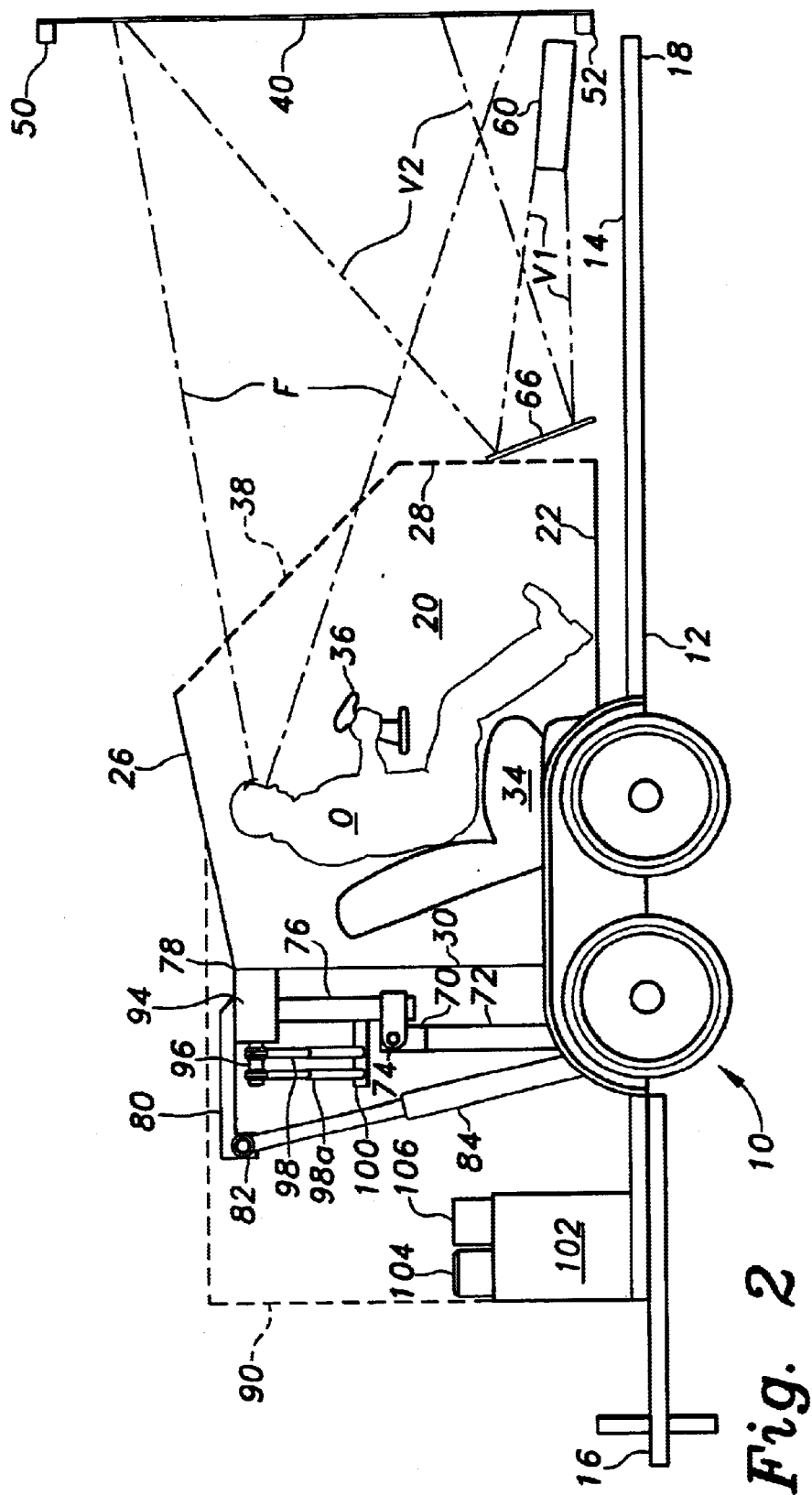
FIG. 2 is a simplified side elevation view of the simulator, showing the layout of the projection system and other features.

FIG. 2 schematically illustrates the general layout and relationship of the video elements of the present flight simulator 10. The projector 60 projects a first video image path V1 which is reflected from a mirror 66 positioned at the lower front panel or wall 28 of the cockpit 20. (Such conventional projector systems as the projector 60 used with the present invention, include means for reversing the left-right orientation of the projected images, for use with mirrors in the projection system.) The mirror 66 reflects the projected image onto the screen 40 by the reflected video image path V2, with the operator O of the simulator then being able to view the entire video image projected onto the screen 40 through the front window or opening 38 of the cockpit 20, as generally indicated by the field of view F.

FIG. 3A provides a side elevation view of a first embodiment of the pitch operation of the present flight simulator apparatus 10. (The pitch and roll mechanisms are also shown in FIGS. 1 and 2 of the drawings.) A fixed support structure or lateral crossmember 68 extends across the width of the trailer 12, with a vertical support arm 70 extending upwardly therefrom. A pair of diagonal braces 72 may be provided for further strength. These components 68 through 72 are permanently and immovably affixed to the trailer 12 structure by welding, bolting, or other suitable means to provide a solid mounting point for the movable cockpit 20, screen 40, and other components immovably attached to the movable cockpit 20 and screen 40 assemblies.

The upper end of the support arm 70 includes a pitch pivot 74, defining a lateral or pitch axis about which the entire cockpit 20, screen 40, projector 60, and linking structural members arcuately pivot when the pitch hydraulic system is activated. A generally L-shaped pitch actuation member has a first arm 76 affixed to the pitch pivot 74 and extending upwardly therefrom to a support point 78 at the upper rear of the cab or cockpit 20. A second arm 80 extends rearwardly from its support point 78 for the cockpit 20, to an attachment 82 with one or more hydraulic struts or cylinders 84. (A second pitch actuation strut 84a may be provided, as shown in FIG. 1 and in the hydraulic schematic of FIG. 7, depending upon the capacity of the hydraulic struts or cylinders used, the weight of the movable structure, the lengths of the arms of the various components, etc.) The pitch actuation strut 84 is anchored at its base at an attachment point 86 at the base of the vertical arm or column 70, as shown in FIG. 1 of the drawings.

Pitch up of the cockpit 20 and screen 40 assemblies is provided when the strut 84 is hydraulically retracted, with the hydraulic actuation being described further below. When the strut 84 is retracted, as shown in broken lines in FIG. 3 of the drawings, the strut attach end 82 of the second arm 80 of the pitch actuation mechanism is drawn downwardly. This pivots the L-shaped pitch actuation arm assembly about its fixed attach point 74 with the support structure components 68 through 72 affixed to the trailer 12, thus raising the cockpit 20 and screen 40 assemblies as indicated in broken lines and by the pitch arrow P1 in FIG. 3.

The cockpit 20 and screen 40 assemblies will automatically lower due to their weight, when pressure is released from the pitch hydraulic cylinder(s) 84 (84a). A series of restrictor valves (indicated in the hydraulic schematic drawing of FIG. 7) are provided to preclude a rapid fall of the cockpit 20 and screen 40 assemblies when hydraulic pressure is released from the cylinder(s) 84 (84a). However, the pitch hydraulic system may also be used to drive the cockpit 20 and screen 40 assemblies rapidly downwardly, if so desired. A detailed discussion of the hydraulic operation is provided in a discussion of the FIG. 7 schematic, further below.

FIG. 1, and to a certain extent FIG. 2, of the drawings are simplified to some extent in order to show more clearly the various mechanical and hydraulic components of the present flight simulator apparatus 10. It will be noted that no covering or enclosure is shown in FIG. 1 for any of the apparatus, and only a limited enclosure is shown in FIG. 2 for the hydraulic and mechanical apparatus. However, it will be seen that the present flight simulator apparatus is preferably enclosed to provide an optimum effect and to exclude ambient light from the screen 40 during operation. Accordingly, FIGS. 3A and 3B illustrate an enclosure or covering 88 which is placed about the upper and lower screen brace arms 42 and 44, and which extends from the screen 40 back to the cockpit 20. The enclosure 88 may be formed of tarps or other flexible material, or may be formed of rigid sheet material, if so desired. Another cover 90 is provided over the hydraulic and mechanical apparatus at the forward end 16 of the trailer 12.

FIG. 3B is a side elevation view of a an alternative second embodiment of the present flight simulator apparatus, designated as simulator apparatus 11. Where components are identical between the embodiments of FIGS. 3A and 3B, identical reference characters are used. Where those equivalent components differ, they are designated by means of odd numbers in FIG. 3B, which odd numbers follow the equivalent even numbered components of FIG. 3A in consecutive order, where possible. The simulator 11 of FIG. 3B differs from the simulator 10 of FIG. 3A in two respects: (1) the cockpit enclosure 21 has been enlarged (lengthened), in order to provide room for a second seat 35 therein for a second occupant; and (2) the pitch hydraulic strut(s) 85 (and 85a, if so equipped) is/are configured to act in compression, rather than in tension, as in the simulator apparatus of FIG. 3A. It will be seen that the extended two seat cockpit or cab 21 may be provided with the pitch actuation mechanism of the flight simulator 10 of FIG. 3A, if so desired, and/or the flight simulator 10 may be equipped with the extended cockpit configuration 21 of FIG. 3B, if so desired.

Most of the components of the two simulator embodiments are identical to one another and share identical reference characters, as noted further above. However, the hydraulic cylinder(s) 85 (and/or 85a) of the pitch mechanism of the simulator 11 in FIG. 3B, attaches to one or more lugs or ears 87, which are disposed somewhat farther forward on the trailer 12 than the pitch strut base attachment point(s) 86 of the flight simulator 10.

The upper end of the support arm 70 includes a pitch pivot 74, defining a lateral or pitch axis about which the entire cockpit 21, screen 40, projector 60, and linking structural members arcuately pivot when the pitch hydraulic system is activated. A pitch actuation arm 77 extends downwardly from the cab support point 78 at the upper rear of the cab or cockpit 21 to attach to a bracket at the pitch pivot 74, continuing downwardly to an attachment point 83 for the extendible ends of the pitch actuation cylinder(s) 85.

Pitch up of the cockpit 21 and screen 40 assemblies of FIG. 3B is provided when the strut 85 is hydraulically extended, with the hydraulic actuation being similar to that for the cockpit and cab 20 of FIG. 3A, described further below. When the strut 85 is extended, as shown in broken lines in FIG. 3B of the drawings, the hydraulic ram attachment end 83 of the pitch actuation arm 77 is pushed forwardly and upwardly, thereby pivoting the arm 77 about its fixed attach point 74 with the support structure components 68 through 72 affixed to the trailer 12, thus raising the cockpit 21 and screen 40 assemblies as indicated in broken lines and by the pitch arrow P1 in FIG. 3B.

The cockpit 21 and screen 40 assemblies operate essentially like those of the cockpit 20 and screen 40 of FIG. 3A, lowering automatically due to their weight when pressure is released from the pitch cylinder(s) 85 (85a). Restrictors may be provided to preclude a rapid fall when hydraulic pressure is released. However, the pitch system may also drive the cockpit 21 and screen 40 assemblies rapidly downwardly, as in the case of the simulator 10.

The lengthened cockpit enclosure 21 of the flight simulator 11 of FIG. 3B provides room for tandem seating for two occupants, if so desired. Accordingly, the original seating position 34 and a new, forwardly disposed seat 35 are illustrated in FIG. 3B in broken lines. The second seat 35 provides room for an instructor or "passenger," who may only wish to experience the ride. The instructor and/or passenger positions may be in either seat 34 or 35 as desired, depending upon the specific control configuration. Both seating positions 34 and 35 may be equipped with redundant dual controls, with a selector switch operable at the command seat to switch output between the two seating positions as desired.

FIG. 4 provides an end elevation view of the roll actuation of the present flight simulator apparatus. It will be seen that as the roll actuation mechanism is positioned rearwardly (relative to the cockpit enclosure 20) from the pitch pivot point 74, that raising the cockpit 20 and screen 40 assemblies will result in the lowering of the roll actuation mechanism. This is necessary in order to provide clearance for the lower corners of the screen 40, during operation of the present simulator apparatus 10. Accordingly, the roll control mechanism is shown in a lowered position in FIG. 4 in solid lines, where it would normally be operated. The higher position of the roll actuation mechanism shown in broken lines in FIG. 4 represents the lowered position for the cockpit 20 and screen 40 assemblies, where the roll actuation mechanism would not be operated; the pitch transition between the two positions is indicated by the pitch arrow P2. A safety switch, not shown, is provided to prevent operation of the roll mechanism until the pitch mechanism raises the screen 40 to a predetermined height.

Figure 7:
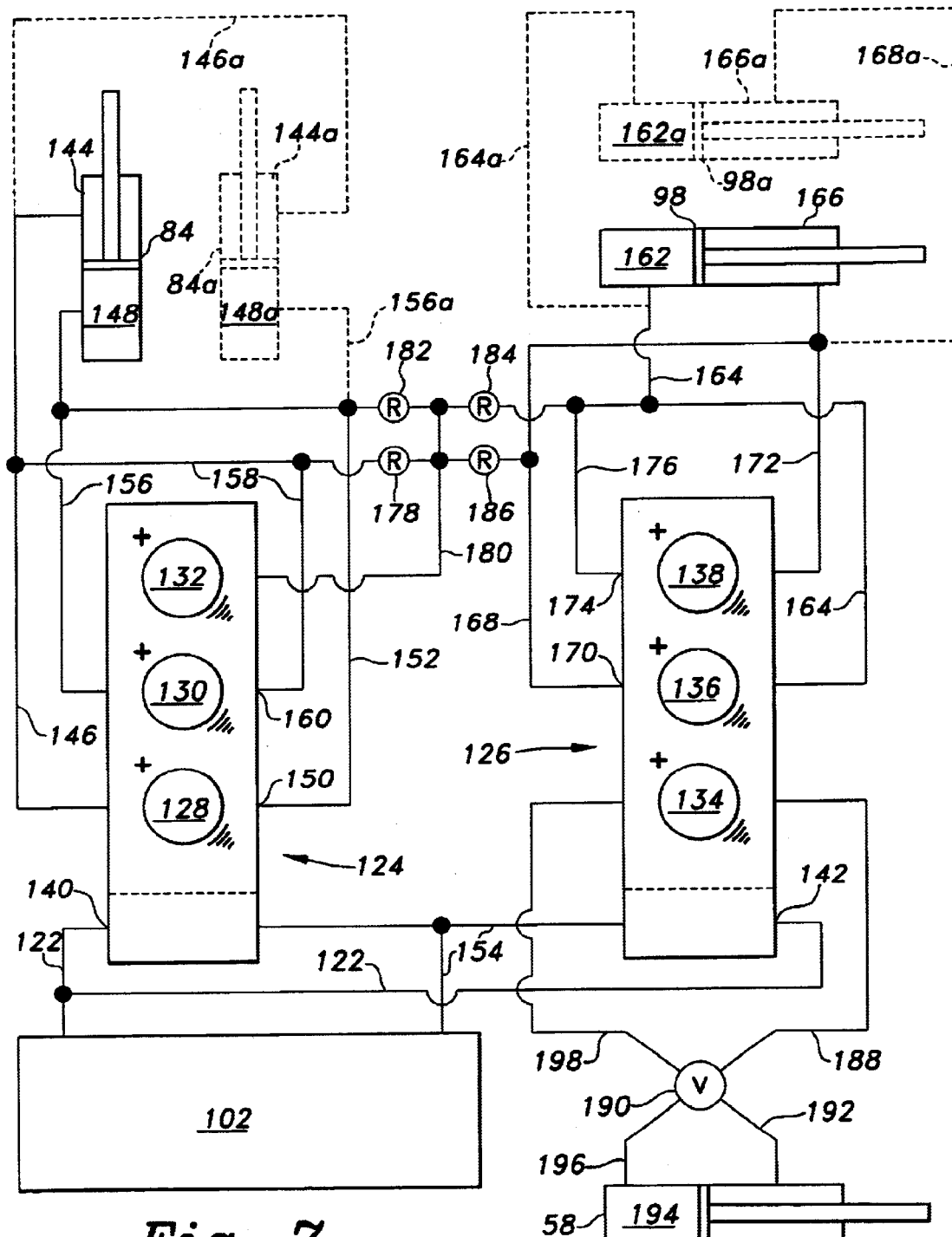
FIG. 7 is a schematic drawing of the hydraulic system of the present portable flight simulator.

The support point 78 of the pitch lever arms 76 and 80 for the cockpit or cab 20 comprises a roll axis shaft 92 which is immovably affixed to the upper rear portion of the cockpit or cab 20, and which passes through a concentric bearing 94 at the juncture of the two arms 76 and 80. A crank arm 96 extends from the end of the roll axis shaft 92 opposite the cockpit 20, with a roll hydraulic cylinder or strut 98 being connected thereto. (As in the case of the pitch actuation mechanism, a second roll strut or cylinder 98a may be provided, as shown in FIGS. 2, 3, and 7.) The opposite base end of the roll strut 98 is secured to a laterally offset arm assembly 100, which projects from the first pitch actuation arm 76 of the pitch actuation mechanism.

The neutral position of the roll hydraulic strut 98 and roll crank arm 96 are shown in broken lines in FIG. 4, with the corresponding cockpit 20 and screen 40 assemblies being shown in solid lines in that drawing Figure. Extension of the roll hydraulic strut 98 (or struts 98 and 98a) results in the left hand or counterclockwise rotation (as viewed from the front end 16 of the trailer 12, or the rear of the cockpit enclosure 20) of the roll crank arm 96 and corresponding roll axis shaft 92 to which it is attached, with the roll axis shaft 92 thus rotating the cockpit 20 and its attached screen assembly 40 in the same arcuate direction, as indicated by the cockpit and screen positions 20L and 40L shown in broken lines in FIG. 4. Retraction of the hydraulic strut(s) 98 (98a) results in the right hand or clockwise rotation of the roll crank arm 96, as shown in solid lines in FIG. 4. The corresponding position of the cockpit and screen are shown in broken lines, and indicated by the cockpit and screen designators 20R and 40R in FIG. 4. The left and right hand, or clockwise and counterclockwise, rotation of the crank arm 96, and corresponding rotation of the cockpit 20 and screen 40 assemblies, is indicated by the roll arrow R in FIG. 4. Again, a safety switch is provided to neutralize and preclude any roll movement when the pitch is lowered to a predetermined point.

Hydraulic power is provided by a conventional hydraulic pump 102 permanently installed upon the trailer 12, with the pump 102 in turn being powered by an electric motor 104. (The hydraulic lines required between the pump 102 and hydraulic struts 58, 84, and 98 are not shown in FIGS. 1 through 4 for clarity in the drawing Figures, but are shown schematically in FIG. 7.) An electrical junction box 106 distributes electrical power to the motor 104 and other electrical components of the flight simulator (computer, projector 60, etc.). The hydraulics of the present invention may require a considerable amount of pressure and flow at various times for abrupt maneuvers. Accordingly, the present system may utilize pressures of around two thousand psi, with flow rates of around eight gallons per minute. A five horsepower, three phase motor has been found to be adequate for such requirements. Other pressures, flow rates, and motor power ratings may be used as required.

The electrical power may be provided by a conventional electrical generator 108, which may be installed upon the bed 14 of the trailer 12, or carried separately therefrom (e.g., in the bed of a tow vehicle for the trailer). The generator 108 is shown separated from the trailer 12 in FIG. 1 for clarity in the drawing Figure, with a power cable 110 extending between the generator 108 and the electrical and hydraulic components 102 through 106. Alternatively, the required electrical power may be supplied from a source at the site of the temporary setup and operation of the present portable flight simulator 10, depending upon the arrangements and available electrical power.

The above described mechanical and hydraulic system is controlled by an operator O who is seated within the cockpit 20, and who reacts to a video presentation projected onto the screen 40 from the projector system 60 by manipulating the control stick 36. The video presentation is in turn provided by a conventional flight simulator program which is run in a conventional small computer (personal computer or the like). The operator manipulates the control stick 36, which interfaces not only with the computer to control the video display projected onto the screen 40, but which also interfaces with and controls the hydraulic system for maneuvering the cockpit and screen assemblies 20 and 40 in pitch and roll.

Figure 5:
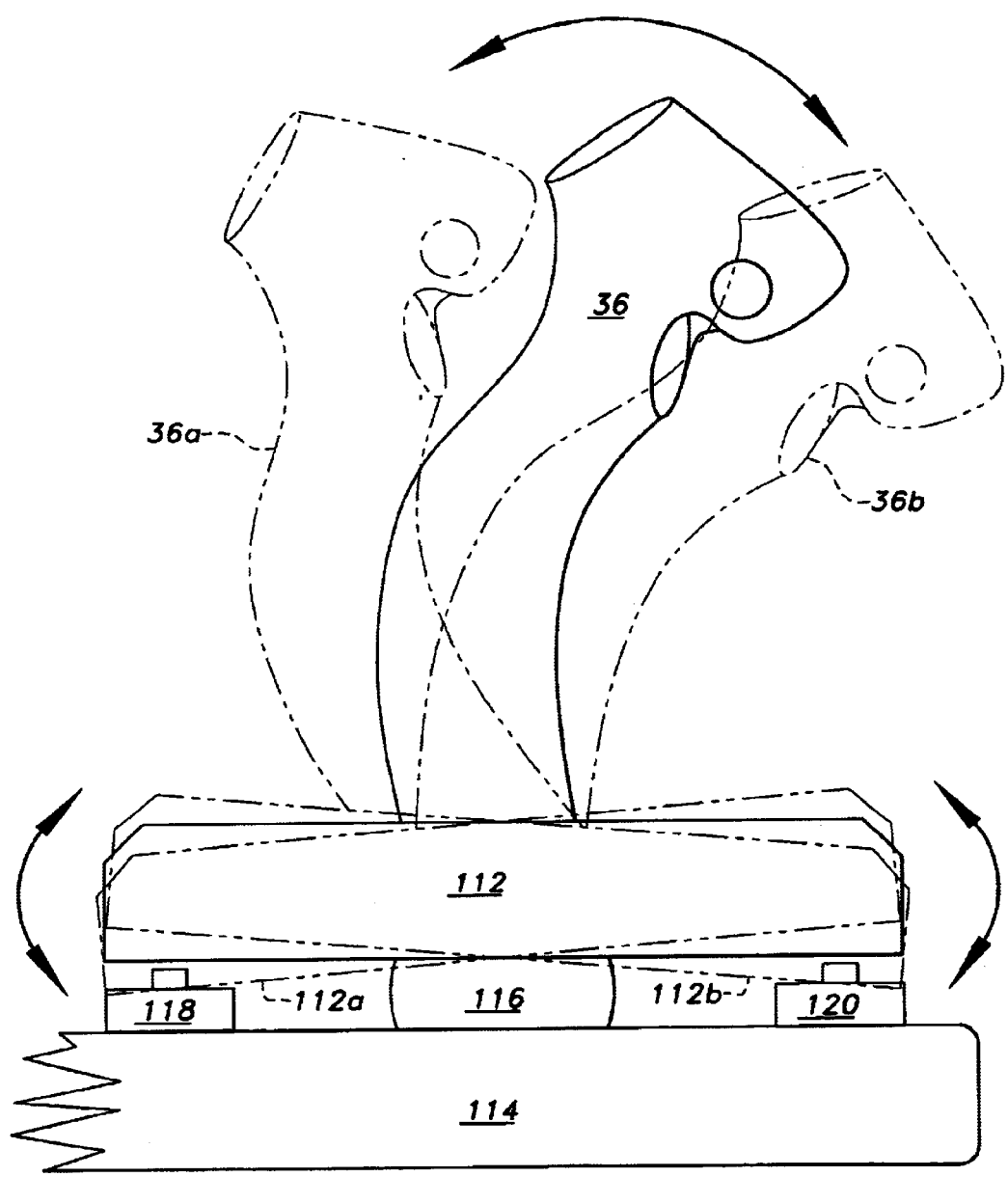
FIG. 5 is a side elevation view of the control stick assembly, showing the installation and actuation of the hydraulic system control microswitches therewith.

FIG. 5 provides a schematic illustration of the means provided for controlling the pitch actuation of the cockpit and screen assemblies 20 and 40 of the present flight simulator apparatus 10. The conventional control stick 36 extends from its conventional base 112, which contains conventional electronic pickups for sensing the movement of the stick 36. The stick 36 movement is transmitted to the computer conventionally, by means of an electrical cord, infrared, etc., depending upon the particular system used. The base 112 of the control stick 36 is arcuately mounted to an underlying surface, such as an arm rest 114 adjacent the seat 34. A spherical pivot 116 may be provided between the arm rest 114 and the overlying control stick base 112, in order to allow the base 112 to pivot or rock slightly fore, aft, left, and right, according to corresponding pressure applied to the stick 36.

A series of four microswitches are provided between the base 112 of the control stick 36 and the underlying supporting surface 114, with the switches being disposed forwardly, rearwardly, to the left, and to the right side of the connecting spherical joint 116 between the control stick base 112 and underlying supporting surface 114. The right side elevation view of FIG. 5 illustrates only the aft or "pitch up" microswitch 118 and the forward or "pitch down" microswitch 120; however, it will be seen that a front or rear elevation view similar to the elevation view of FIG. 5 but turned ninety degrees thereto, would illustrate the left and right roll control microswitches, which operate using the same principle as the pitch microswitches 118 and 120.

These microswitches, e.g., switches 118 and 120, interface with the corresponding electrohydraulic servo valves (discussed further below) for controlling the appropriate hydraulic cylinders for moving the cockpit and screen assemblies 20 and 40 in pitch and roll. When the stick 36 is moved rearwardly in the "pitch up" direction, as shown by the stick position 36a of FIG. 5, the base 112 is pivoted slightly rearwardly as well to the position 112a, thereby closing the microswitch 118 to actuate the corresponding electrohydraulic servo valve to retract the pitch hydraulic strut 84 (and 84a, if provided). The opposite action, indicated by the stick position 36b and corresponding base position 112b, closes the forward "pitch down" microswitch 120, thereby extending the pitch hydraulic strut 84 (and optionally, 84a) to cause a forward or "nose down" pitch of the cockpit and screen assemblies 20 and 40.

As noted throughout the present disclosure, an important attribute of the present flight simulator 10 is its portability. The erection and folding of the screen 40 has been described in detail further above. The various upper and lower screen brace arms 42 and 44 are easily stored on the bed 14 of the trailer 12, alongside the cockpit or cab 20, with the screen 40 being rolled or folded and stored similarly. The resulting disassembled screen allows the present flight simulator apparatus to be carried entirely within the length and width of the conventional automobile carrier trailer 12, with the total width and height not exceeding seven feet and with a total length of no more than twenty one feet.

Figure 6:
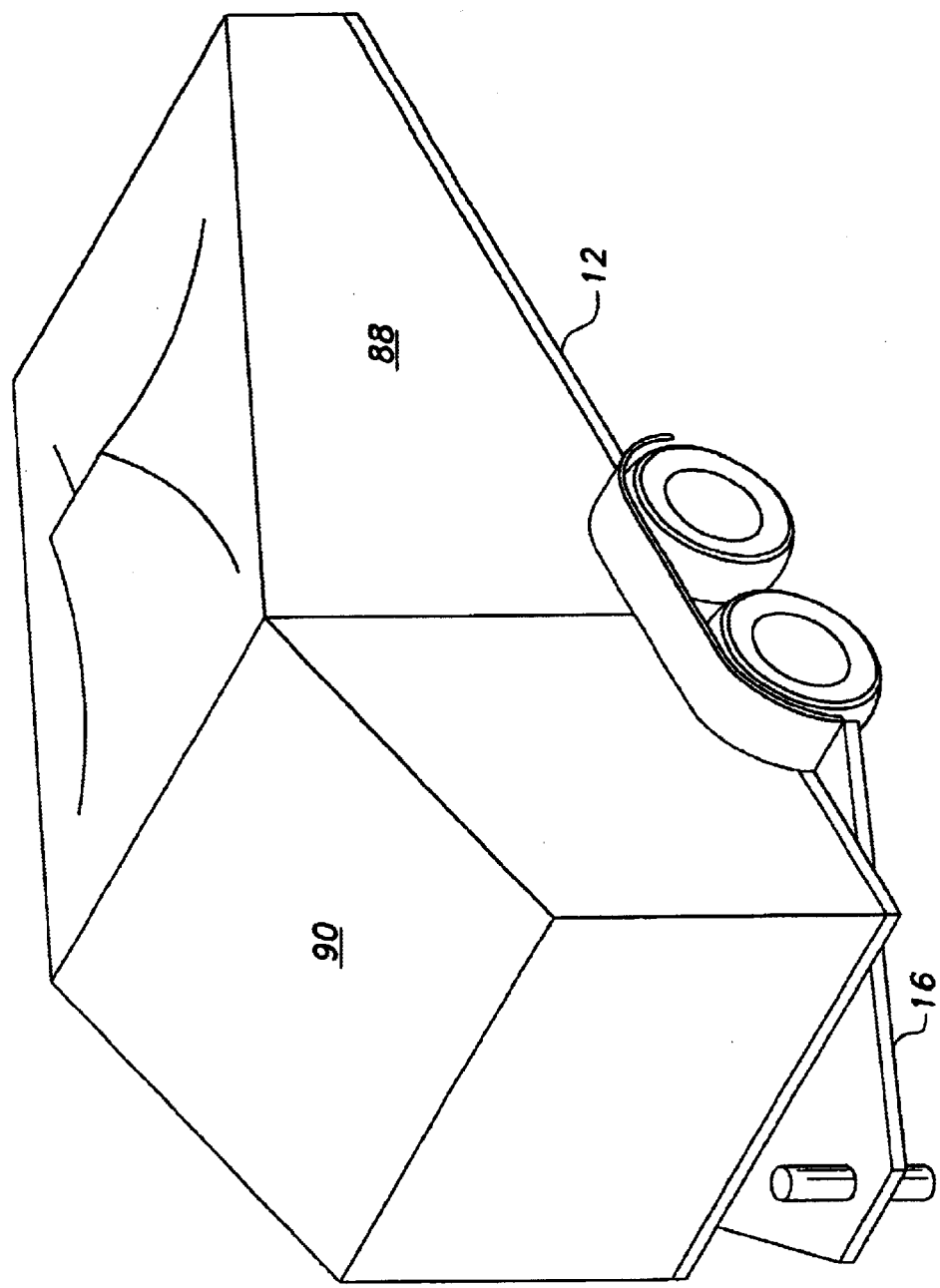
FIG. 6 is a perspective view having a viewpoint similar to the view of FIG. 1, showing the mechanism folded and covered for storage or transportation.

FIG. 6 illustrates the folded configuration of the present portable flight simulator 10, ready for storage or transport to a site for operation. As noted further above, the space between the cockpit 20 and screen 40 is preferably enclosed, in order to block the entry of ambient light which would "wash out" the video presentation on the screen 40. (The enclosure would also preclude the entry of foreign objects between the cockpit and screen during operation, e.g., objects tossed by spectators, etc.). The same tarpaulins 88 or other sheet material used for enclosing the area between the screen 40 and cockpit 20, may be used to enclose the collapsed screen support arm 56, generally as shown in FIG. 6 of the drawings. (The end of the screen lift strut 58 may raise the center of the covering 88, as shown in FIG. 6.) The hydraulic and mechanical components of the present simulator, disposed at the front 16 of the trailer 12, are covered by another enclosure 90.

FIG. 7 provides a general schematic of the hydraulic system for the operation of the present portable flight simulator 10. Hydraulic fluid pressure is developed by the hydraulic pump 102. The pump 102 is conventional, and is indicated by the correspondingly marked rectangular area in FIG. 7. The pump 102 is powered by an electric motor 104 which in turn may be provided with electrical energy from a generator 108 or other electrical power source, as discussed further above and shown generally in FIGS. 1 through 3 of the drawings. Hydraulic fluid passes from the pump 102 through an outlet or fluid supply line 122 which is teed to provide fluid pressure and flow to two electrically actuated hydraulic manifold servo valves, respectively 124 and 126.

The first manifold 124 controls the pitch hydraulic strut(s) or cylinder(s) 84 (84*a*), while the second manifold 126 controls the roll hydraulic strut(s) or cylinder(s) 98 (98*a*). Each of the manifold servos 124 and 126 includes a series of three electrically actuated hydraulic valves therein, respectively first through third valves 128, 130, and 132 for the first or pitch control manifold hydraulic servo 124, and first through third valves 134, 136, and 138 for the second or roll control manifold 126. Each of the separate hydraulic valves 128 through 138 is electrically actuated, as indicated by the conventional electrically positive and ground symbols at each of the valves. The valves 128 through 138 all accept hydraulic fluid from the inlet portions of their respective manifold valve assemblies, respectively inlet 140 for the first manifold 124 and inlet 142 for the second manifold 126.

As an example of the operation of the hydraulic system of the present flight simulator apparatus, let us assume that the operator O of the simulator applies back pressure to the control stick to command a pitch up motion to the cockpit 20 and screen 40 assemblies. The back pressure on the stick 36 causes the stick base 114 to rock slightly rearwardly and to apply pressure to the nose up pitch microswitch 118, as shown by the respective stick and base positions 36*a* and 112*a* in FIG. 5. This action closes the pitch up microswitch 118, sending an electrical signal to the first hydraulic solenoid valve 128 and opening that valve 128 to provide hydraulic flow to the retraction side 144 of the pitch hydraulic strut 84 (and side 144*a* of the second strut 84*a*, if so equipped), via the pitch up hydraulic line 146 (146*a*). This results in the retraction of the pitch strut(s) 84 (84*a*), thus drawing the second arm 80 of the pitch actuator mechanism downwardly and pitching the cockpit 20 and screen assembly 40 upwardly, as shown in FIG. 3.

Hydraulic fluid within the extension side(s) 148 (148*a*) of the pitch hydraulic cylinder(s) 84 (84*a*) must be allowed to escape as the strut(s) 84 (84*a*) is/are retracted, as noted above. Accordingly, return fluid from the extension side(s) 148 (148*a*) of the cylinder(s) 84 (84*a*) returns to the return side 150 of the first valve 128 via the hydraulic return line 152, and thence back to the hydraulic pump 102 (or reservoir) via a return line 154 which is teed between the two manifolds 124 and 126. The line 152 is also teed to a line from the outlet side of the closed second valve and to a restrictor, which functions are described further below.

When the operator O of the simulator commands a pitch down by forward manipulation of the control stick 36, the forward or "pitch down" microswitch 120 is closed due to the pressure of the overlying control stick base 112, as indicated by the base position 112*b* in FIG. 5. This sends an electrical signal to the second or "pitch down" electrohydraulic servo valve 130 of the first or pitch control manifold 124, opening the valve 130 and allowing hydraulic fluid to flow to the extension side 148 (148*a*) of the pitch control hydraulic cylinder(s) 84 (84*a*) via the pitch down hydraulic line 156 (156*a*). This pitch down hydraulic line 156 is also teed to the return side of the now closed first valve 128, thus no fluid can flow back through the first valve 128 when the second valve 130 is actuated to extend the cylinder(s) 84 (84*a*).

Fluid in the now contracting retraction side 144 (144*a*) of the pitch cylinder(s) or strut(s) 84 (84*a*) is allowed to escape via the fluid supply line 146 (146*a*) for the retraction side(s) of the pitch cylinder(s) 84 (84*a*). However, the now closed first valve 128 will not accept fluid flow therethrough. Accordingly, the fluid line 146 (146*a*) to the retraction side(s) 144 (144*a*) of the cylinder(s) 84 (84*a*) is teed to a return flow line 158 which connects to the return port or side 160 of the second valve 130, allowing fluid to escape from the retraction side(s) 144 (144*a*) of the cylinder(s) 84 (84*a*) and to flow back to the pump 102 (or reservoir) via the return line 154. The pitch down line is also teed to a restrictor valve, which function is explained further below.

Roll control of the present flight simulator apparatus is provided in a manner similar to that described above for pitch control, with the roll hydraulic cylinder(s) 98 (98*a*) providing the rolling force. Left and right microswitches are provided for sending an electrical signal to the respective valves of the second or roll control manifold valve 126. These roll microswitches are not shown in FIG. 5, but are essentially identical to the pitch microswitches 118 and 120 of that Figure, which functions were described in detail further above. The roll switches are positioned laterally beneath the left and right edges of the base 112 rather than beneath the forward and rearward edges thereof.

When a left roll is commanded by moving the stick 36 to the left, the left side of the base 112 is tilted to the left, thereby compressing the left roll microswitch and closing its circuit. This sends a signal to the second solenoid valve 136 of the second or roll control manifold valve 126, opening the valve 136 and allowing fluid to flow to the extension side(s)

162 (162a) of the roll control hydraulic strut(s) 98 (98a) via the supply line 164 (164a). This extends the roll strut(s) 98 (98a), causing a left roll in accordance with the mechanism of FIGS. 1 and 4 of the drawings. Return flow from the retraction side(s) 166 (166a) of the roll cylinder(s) 98 (98a) is provided via the retraction side hydraulic line 168 (168a), which connects to the return port 170 of the second valve 136 of the second manifold 126. The retraction side line 168 is also teed to the output side of the third valve 138 and to a restrictor, which functions are described further below.

Rolling the cockpit 20 and screen assembly 40 to the right is accomplished by arcuately moving the control stick 36 to the right, thereby tilting the stick base 112 to the right and compressing the right side roll microswitch to close its circuit and send an electric signal to the third electrohydraulic solenoid valve 138 of the second or roll control manifold 126. This causes the third valve 138 to open, thereby allowing fluid to flow to the retraction side(s) 166 (166a) of the roll control hydraulic cylinder(s) or strut(s) 98 (98a) via the roll strut retraction line(s) 172, which may be connected to the retraction line 168a for the optional second strut 98a. This causes the roll cylinder(s) 98 (98a) to retract, thus rolling the cockpit 20 and screen 40 assemblies to the right, in accordance with the mechanisms illustrated in FIGS. 1 and 4 of the drawings.

Return fluid from the extension side(s) 162 (162a) of the roll hydraulic strut(s) 98 (98a) flows back through the extension side supply line(s) 164 (164a). Fluid within the line 164 cannot flow back through the now closed second valve 136, but flows back to the return side or port 174 of the open third valve 138 via a tee to a return line 176, in the manner used for return flow for pitch up, pitch down, and left roll hydraulic fluid return. As in the case of lines for the pitch up, pitch down, and left roll functions, this right roll return line is also teed to a restrictor, which functions as described below.

An examination of FIGS. 1 through 4 of the drawings clearly shows that the attachment point 78 of the pitch and roll actuation mechanism to the cab or cockpit 20, is well above and aft of the center of gravity of the cockpit 20 and screen 40 assembly, with their combined center of gravity being located generally in the center of the forward portion of the cockpit 20. Thus, if the cockpit 20 and screen 40 assembly is allowed to assume its natural position with no force being input from the hydraulic system, the cockpit 20 and screen 40 assembly will pitch and roll to a horizontal position to rest upon the bed 14 of the trailer 12.

Accordingly, some means must be provided to dampen or slow such movement, to prevent the rapid falling of the cockpit 20 and screen assembly 40 to the bed 14 of the trailer 12, in the event that hydraulic pressure is lost when the assembly is raised. The restrictors noted above which are placed in the various hydraulic supply and return lines, provide this function. These restrictors are only opened when the control stick 36 is neutralized, with all pitch and roll microswitches being open. If the control stick 36 is moved to tilt the stick base 112 to close any of the pitch and roll microswitches, the restrictors are closed. This may be accomplished by means of a normally open restrictor control valve 132 wired in parallel with all of the pitch and roll switches in the control stick base 112. When the control stick 36 is in neutral with all microswitches open and no electrical power being provided to the restrictor control valve 132, the control valve 132 opens to allow hydraulic fluid to flow through the restrictor valves.

As an example of the above, if the control stick 36 is neutralized after a pitch up command, all of the electrohydraulic pitch and roll valves 128, 130, 136, and 138 will close. This causes the normally open electrohydraulic restrictor control valve to open, thus allowing hydraulic fluid to pass from the retraction side(s) 144 (144a) of the pitch control cylinder(s) 84 (84a) through the pitch down restrictor 178, and thence back to the now open restrictor control valve 132 (provided as the third electrohydraulic valve in the first manifold 124), via the restrictor return line 180, and through the first manifold 124 to the hydraulic pump 102 (or reservoir) via the pump return line 154.

Fluid may also flow between the expansion side 148 (148a) and retraction side 144 (144a) of the pitch control cylinder(s) 84 (84a), by means of the first pitch control restrictor valve 178 and a second pitch control restrictor valve 182. This flow will provide the majority of the flow required to balance the volume of fluid required between the two sides of the cylinder(s) 84 (84a), with some additional fluid being required as the cylinder(s) 84 (84a) expand, due to the smaller volume displaced by the extended piston rod as it extends from the cylinder. This additional fluid is drawn from the return side of the pump (or reservoir) by means of the return line 154 through the first manifold 124, and through the open restrictor control valve 132. Excess fluid displaced due to the compression of the strut(s) 84 (84a) flows back to the pump 102 (or reservoir) through the return line 180, the open restrictor control valve 132, and return line 154.

The two roll control restrictor valves operate in much the same manner as described above for the pitch control restrictor valves 178 and 182. When the control stick 36 is released after commanding a left roll, the left roll control microswitch (and other microswitches disposed at the base 112 of the stick 36) is placed in its normally open condition, with the electrically open switches serving to close the left roll control valve 136 (and all other pitch and roll control valves as well). The opening of the four pitch and roll switches results in a signal being sent to the restrictor control valve 132, causing that valve to open. Thus, hydraulic fluid can flow from the extension end(s) 162 (162a) of the roll control cylinder(s) 98 (98a), back through the expansion side line 164 (164a) and through the left roll control restrictor 184, thence to the restrictor return line 180 to the pump (or reservoir) via the return line 154.

As noted in the description of the operation of the pitch control restrictors 178 and 182, most of the flow will pass between the left roll restrictor 184 and its right side counterpart 186, rather than flowing to and from the pump 102 or reservoir. Again, the extension and retraction of the piston rods of the roll control cylinder(s) 98 (98a) will affect the total volume within the cylinder(s), thus requiring some fluid to be returned to the pump 102 (or reservoir) as the strut(s) 98 (98a) slowly retract during recovery from a left roll, and requiring some fluid to be drawn from the pump (or reservoir) during strut extension during recovery from a right roll.

The above system with its restrictors, provides a reasonable simulation of positive pitch and roll stability for the operator of the present simulator. If the operator becomes disoriented or is otherwise incapable of operating the control system as required, the simple release of the control stick 36 results in the cockpit 20 and screen 40 assembly slowly returning to the horizontal in both pitch and roll axes. The restrictor system requires the operator to apply periodic control corrections in order to maintain a non-horizontal pitch and/or roll orientation, but most real aircraft require much the same control inputs, particularly in pitch, where they normally exhibit positive longitudinal stability.

A final control valve in the hydraulic system provides for the raising and lowering of the screen lift arm 56 by the screen lift cylinder 58. This is accomplished by the first control valve 134 of the second (roll control) valve manifold 126. When this screen extension control valve 134 opens, hydraulic fluid flows through the screen control valve supply line 188, to a screen control valve 190. The screen control valve 190 may be a conventional four way valve, routing fluid from the supply line 188 to a cylinder retraction line 192 to raise the screen 40, with return flow from the expansion side 194 of cylinder 58 passing through a cylinder expansion line 196, through the valve 190, and back to the screen control valve 134 via a return line 198. Flow reversal to lower the screen 40 is achieved by switching the four way valve 190, with flow passing from the supply line 188 to the cylinder expansion line 196, and from the retraction line 192 to the return line 198.

Figure 8:
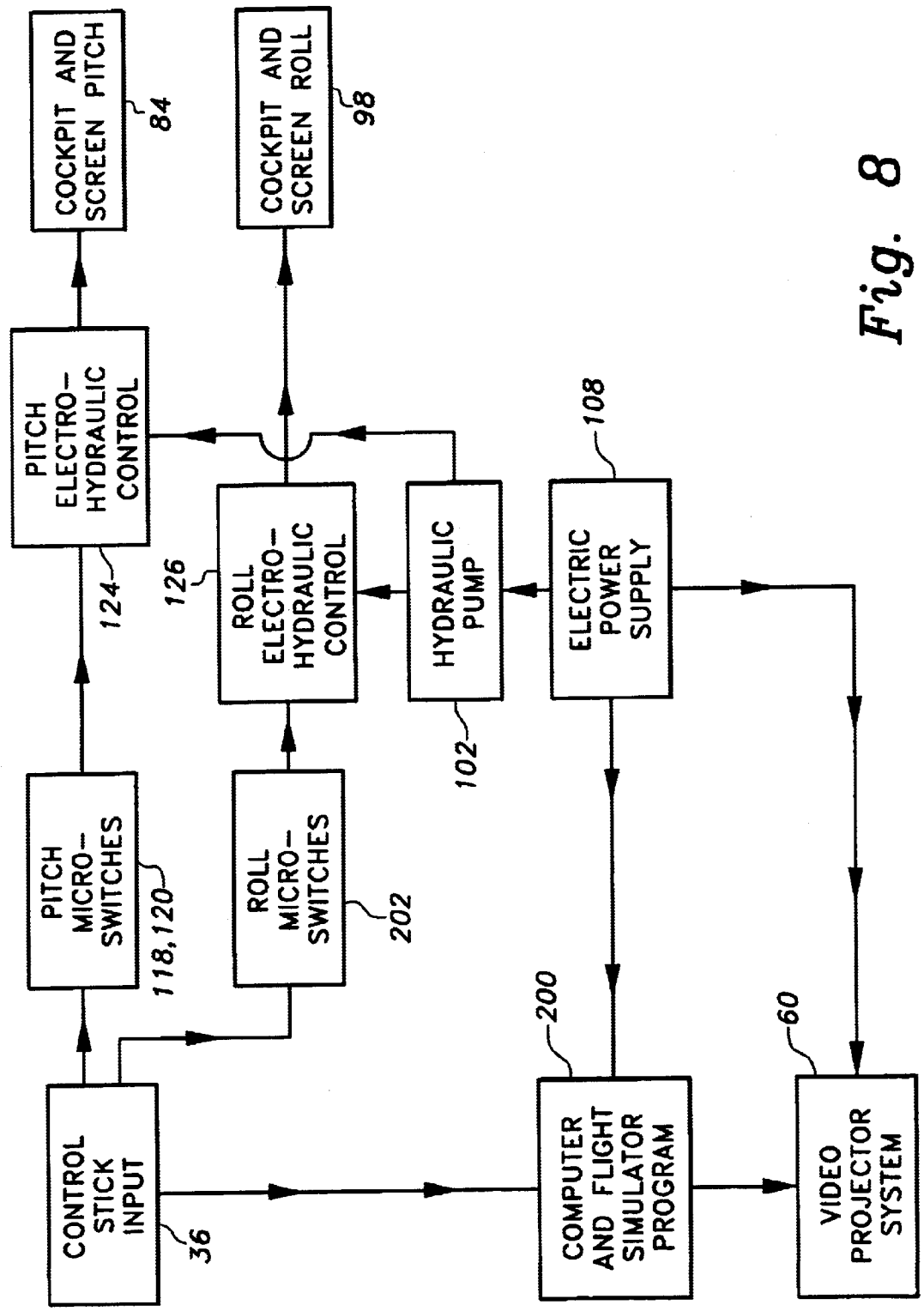
FIG. 8 is a block diagram of the various components of the present portable flight simulator, and their interrelationships.

FIG. 8 provides a block diagram of the basic components of the present flight simulator system, and their interrelationships. The present simulator system includes a conventional computer having a conventional flight simulator program installed therein, as indicated by the block 200 in FIG. 8 of the drawings. A conventional personal computer having sufficient capacity for the operation of the flight simulator program installed therein, is sufficient for the operation of the present flight simulator. Such computers and programs are well known for use in the home environment, and have proven to be cost effective and relatively reliable.

The computer 200 is driven by a conventional flight simulator control stick or "joystick" 36, as described further above. Other controls, e.g., throttle, etc., may be provided in accordance with the level of the flight simulator program used. The control stick 36 may include various additional controls thereon for simulating gun operation, bomb release, trim, etc., again depending upon the level of the simulator program and sophistication of the computer control stick 36 used. It should be noted that while the control stick 36 described herein is illustrated as being installed upon the right side arm rest 114 in the cockpit 20 of FIG. 1, that such a control stick may be made in a longer configuration with its base mounted to the floor structure 22 of the cockpit 20, if so desired. The function of the microswitches sandwiched between the base of such a stick and the underlying structure, remains the same.

Rather than running a conventional computer monitor, the computer 200 drives the video projector system 60 used with the present flight simulator 10. The computer 200 and video projector system 60 both receive their electrical power from an electric power supply 108, described further above. The electric power supply 108 also provides power for the hydraulic pump 102 used in the present invention for supplying hydraulic pressure and flow to the pitch hydraulic cylinder 84 and roll hydraulic cylinder 98, respectively by means of the pitch electrohydraulic control manifold 124 and roll electrohydraulic control manifold 126, illustrated schematically in FIG. 7 of the drawings.

The two electrohydraulic manifolds 124 and 126 are in turn controlled respectively by the two pitch microswitches 118 and 120 and two roll microswitches (not shown, but indicated by the block 202 in FIG. 8) installed at the base 112 of the control stick 36. As described further above, movement of the control stick 36 affects the flight simulator program video display projected on the screen 40 by means of the projector 60, with corresponding actuation of the microswitches 118, 120, and 202 resulting in corresponding pitch and roll motions of the cockpit 20 and attached screen 40 assembly, as described further above. Additional features, e.g., rudder pedals 204, conventional audio system (not shown) for providing audible output to the simulator operator or for music for the operator during operation of the simulator, etc., may be provided as desired, either by means of the audio output of the computer 200, or by means of a separate sound system.

In summary, the present portable flight simulator serves well to meet a need for a device which is quickly and easily set up, easy to use for the casual operator, and yet provides the motion and realism found in much more costly fixed location simulators having various degrees of freedom of motion. The present simulator is easily carried in its folded or stored configuration on a single flat bed trailer, with which it may be transported to any desired destination (shopping malls, carnivals, fairs, etc.). Erection of the screen and setup of the remaining apparatus is easily accomplished by perhaps two persons in a very short period of time, i.e., well under an hour. Essentially the only work required, is the erection of the screen upon its supports, the covering of the area between the screen and cockpit as desired, installation of corner jacks or braces at the corners of the trailer for stability, and the initializing of the electrohydraulic system for operation.

While the present disclosure notes that the area between the screen and cockpit may be enclosed using tarps or other flexible materials, it should be noted that more rigid materials may be used if so desired. In fact, the entire trailer and flight simulator apparatus stored in a folded condition thereon, may be covered with a relatively hard shell. The hydraulic system and screen lift hydraulic strut of the present simulator, may be used to lift the shell from the trailer and set aside, where it may be used as a waiting and training area for prospective operators of the simulator.

When a given period of operation has ended, the present simulator is easily folded or partially disassembled for storage of transportation, essentially by reversing the order of the steps required for erection and operation of the device. Small carnival operators and others who have need of attractions which are highly interesting and entertaining to draw customers, and yet which are easily portable for transportation between various areas and for compact storage when required, will find the present portable flight simulator to be a most valuable addition to their inventory.

It is to be understood that the present invention is not limited to the sole embodiment described above, but encompasses any and all embodiments within the scope of the following claims.

I claim:

1. A portable flight simulator, comprising:

a mobile trailer base having an operator cockpit installed thereon;

a video screen foldably extending from said cockpit and immovably secured thereto by a plurality of removable arms when said video screen is erected for operation, for providing a large field of view for an operator disposed within said cockpit when said video screen is erected for operation;

video projector means;

computer means communicating with said projector means for operating a video program, and a video program installed within said computer means for selectively projecting upon said screen by said projector means;

a pitch mechanism and a roll mechanism for pivotally securing said cockpit, said projector means, and said screen to said trailer base and for selectively arcuately moving said cockpit, said projector means, and said screen about corresponding pitch and roll axes;

hydraulic actuation means for said pitch mechanism and said roll mechanism; and control means disposed within said cockpit and communicating with said computer means for controlling said video program and said hydraulic actuation means.

2. The portable flight simulator according to claim 1, wherein said control means further comprises:

a control stick disposed within said cockpit for controlling said video program;

said control stick having a base arcuately mounted to an underlying support;

a plurality of electric switches disposed beneath said control stick base; and said switches communicating with said hydraulic actuation means for selectively actuating said pitch mechanism and said roll mechanism when said control stick and said base are correspondingly manipulated.

3. The portable flight simulator according to claim 1, wherein said video screen is selected from the group consisting of a translucent screen and an opaque screen.

4. The portable flight simulator according to claim 1, wherein said video projector means further comprises:

said video screen having a base, and said cockpit having a forward panel;

said projector means comprising a video projector disposed at said base of said screen, and projecting toward said cockpit; and a mirror disposed at said forward panel of said cockpit and facing said screen, for reflecting video images from said projector to said screen.

5. The portable flight simulator according to claim 1, wherein:

said cockpit further includes a forward panel having an upper portion; and at least said upper portion of said forward panel is open, for providing the operator with a view of said video screen.

6. The portable flight simulator according to claim 1, further including enclosure means foldably and removably extending from said cockpit to said video screen.

7. The portable flight simulator according to claim 1, wherein said video screen further includes:

at least an upper and a lower laterally disposed screen support;

a screen lift arm pivotally extending between said cockpit and said upper screen support; and a screen lift strut telescopingly extending between said cockpit and said screen lift arm, for selectively raising said screen lift arm and said upper screen support for selectively erecting said video screen.

8. The portable flight simulator according to claim 7, wherein said screen lift strut is a hydraulic cylinder operating in tension.

9. The portable flight simulator according to claim 1, wherein said hydraulic actuation means for said pitch mechanism and said roll mechanism each further include a pair or hydraulic cylinders.

10. The portable flight simulator according to claim 1, wherein:

said cockpit, said projector means, and said screen have a combined center of gravity disposed forwardly and below said pitch axis and said roll axis, and;

said cockpit, said projector means, and said screen pitch and roll to a horizontal orientation when hydraulic pressure is released within said pitch mechanism and said roll mechanism.

11. A portable flight simulator, comprising:

a mobile trailer base having an operator cockpit installed thereon;

a video screen extending from said cockpit;

video projector means;

computer means communicating with said projector means for operating a video program, and a video program installed within said computer means for selectively projecting upon said screen by said projector means;

a pitch mechanism and a roll mechanism for pivotally securing said cockpit, said projector means, and said screen to said trailer base and for selectively arcuately moving said cockpit, said projector means, and said screen about corresponding pitch and roll axes;

hydraulic actuation means for said pitch mechanism and said roll mechanism; and a control stick disposed within said cockpit for controlling said video program;

said control stick having a base arcuately mounted to an underlying support;

a plurality of electric switches disposed beneath said control stick base; and said switches communicating with said hydraulic actuation means for selectively actuating said pitch mechanism and said roll mechanism when said control stick and said base are correspondingly manipulated.

12. The portable flight simulator according to claim 11, wherein:

said video screen foldably extends from said cockpit, and;

said video screen is immovably secured to said cockpit by a plurality of removable arms when said video screen is erected for operation, for providing a large field of view for an operator disposed within said cockpit when said video screen is erected for operation.

13. The portable flight simulator according to claim 11, wherein said video screen is selected from the group consisting of a translucent screen and an opaque screen.

14. The portable flight simulator according to claim 11, wherein said video projector means further comprises:

said video screen having a base, and said cockpit having a forward panel;

said projector means comprising a video projector disposed at said base of said screen, and projecting toward said cockpit; and a mirror disposed at said forward panel of said cockpit and facing said screen, for reflecting video images from said projector to said screen.

15. The portable flight simulator according to claim 11, wherein:

said cockpit further includes a forward panel having an upper portion; and at least said upper portion of said forward panel is open, for providing the operator with a view of said video screen.

16. The portable flight simulator according to claim 11, further including enclosure means foldably and removably extending from said cockpit to said video screen.

17. The portable flight simulator according to claim 11, wherein said video screen further includes:

at least an upper and a lower laterally disposed screen support;

a screen lift arm pivotally extending between said cockpit and said upper screen support; and a screen lift strut telescopingly extending between said cockpit and said screen lift arm, for selectively raising said screen lift arm and said upper screen support for selectively erecting said video screen.

18. The portable flight simulator according to claim 17, wherein said screen lift strut is a hydraulic cylinder operating in tension.

19. The portable flight simulator according to claim 11, wherein said hydraulic actuation means for said pitch mechanism and said roll mechanism each further include a pair or hydraulic cylinders.

20. The portable flight simulator according to claim 11, wherein:

said cockpit, said projector means, and said screen have a combined center of gravity disposed forwardly and below said pitch axis and said roll axis, and;

said cockpit, said projector means, and said screen pitch and roll to a horizontal orientation when hydraulic pressure is released within said pitch mechanism and said roll mechanism.

* * * * *